April 26, 1932.   G. A. UNGAR   1,855,371
PORTABLE POWER DRIVEN SAW
Original Filed March 29, 1929   2 Sheets-Sheet 1
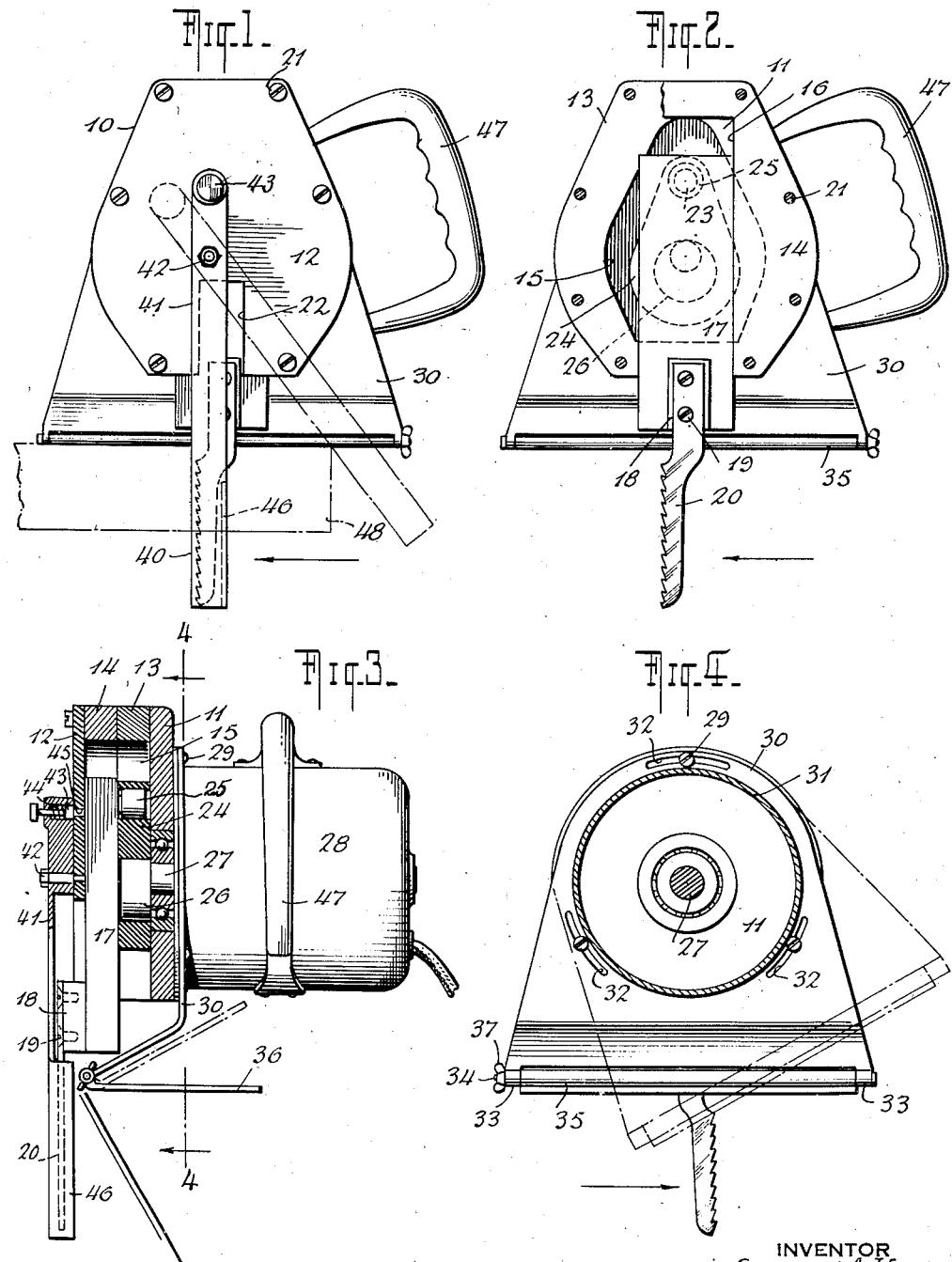
INVENTOR
GUSTAVE A. UNGAR,
BY
ATTORNEYS.

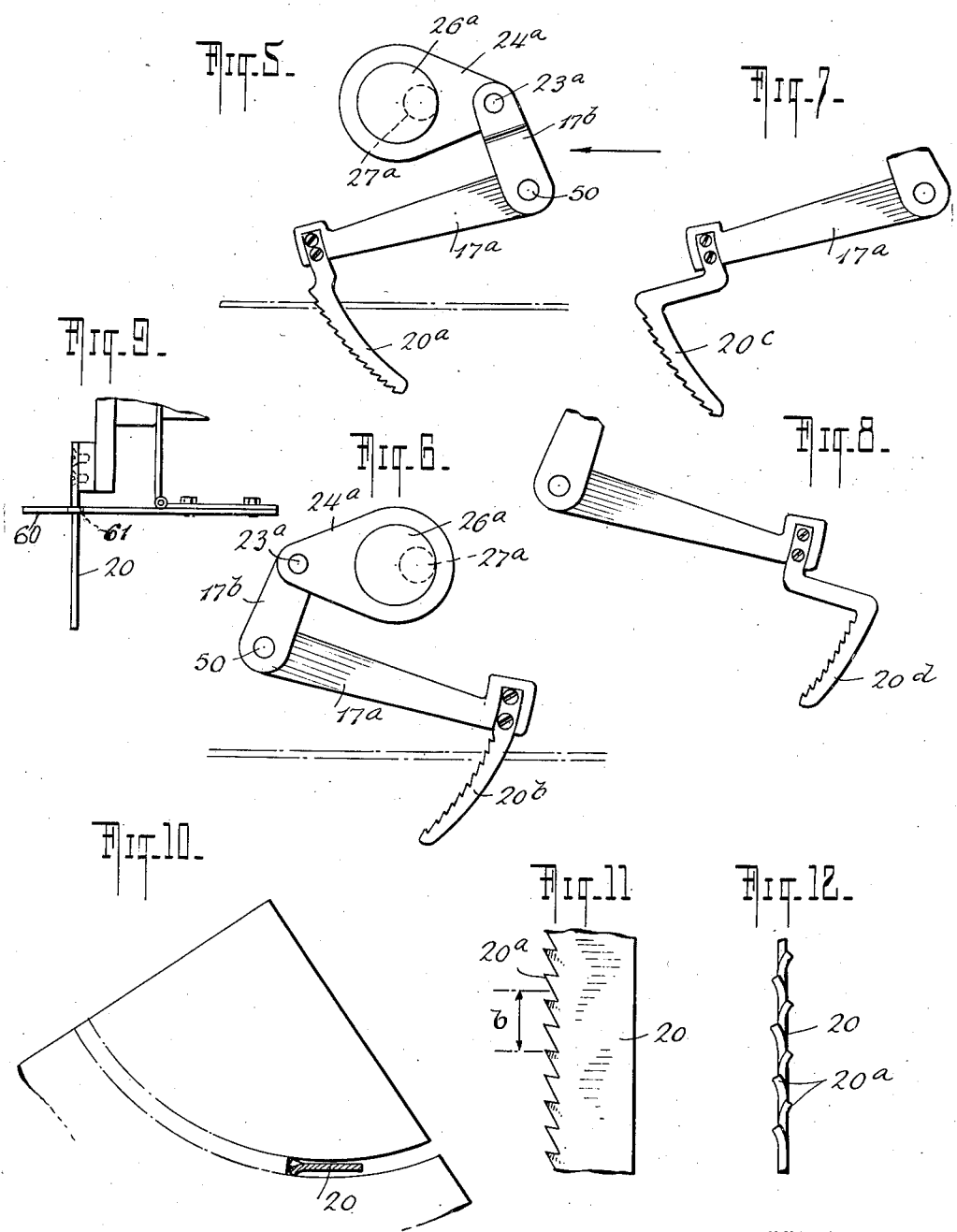

Patented Apr. 26, 1932

1,855,371

UNITED STATES PATENT OFFICE

GUSTAVE A. UNGAR, OF PELHAM MANOR, NEW YORK

PORTABLE POWER DRIVEN SAW

Application filed March 29, 1929, Serial No. 351,009. Renewed February 27, 1931.

This invention relates to power driven saws and particularly to portable power driven saws adapted for industrial uses.

The use of portable relatively high speed tools such as drills, saws and the like, as a part of the regular equipment of mechanics in all kinds of industrial work has become quite common and enables the mechanic to obtain a greater output than can be had with the use of purely hand operated devices. While the use of electric motors and the like, for driving small portable drills and similar machines has been quite common for some years, it is only recently that attempts have been made to produce a small, or portable, power driven saw particularly adapted for sawing wood. As far as I am aware, the portable power driven saws now in actual use are limited to that type of saw in which a circular saw blade is rotated at high speed by means of an electric motor. While this type of portable saw operates with a fair degree of satisfaction, it is, however, subject to the objection that the saw blades which must be used are very expensive, furthermore such blades cannot be sharpened except by the use of special grinding machinery. In addition, the thickness of material which can be cut with a circular portable saw is quite limited unless saw blades of very large diameter are employed. The saw blades usually employed in such saws are generally not over six or eight inches in diameter and as the blades are rotated at a very high speed by the electric motor, there is, even with blades of this size, grave danger of injury to the user if the saw blade should be broken while the tool is in use, the centrifugal force due to the high speed of rotation throwing the broken pieces of saw blade off into space with a high velocity. Because of this danger, it therefore can be seen it becomes a matter of practical impossibility to increase the diameter of the saw blade so as to permit the sawing of material having a greater thickness than approximately two inches.

The principal object of this invention is to provide a new and improved construction for a portable power driven saw that will overcome the objectionable features inherent in the high speed rotary circular saws. Another object is to provide a new and improved construction for a device of the character set forth, in which the saw blade is reciprocated in a manner analogous to the commonly used hand saw. A further object is to provide a portable sawing machine in which the saw blades are of simple inexpensive type and are provided with saw teeth such as are used in the ordinary hand saw, thereby not only obviating the objectionable high cost of the circular type saw but also providing a saw blade of a type that can be sharpened by a skilled mechanic in a manner similar to that employed for sharpening the usual hand saw.

Another object is to so construct a portable power driven hand saw that the reaction forces, produced when the cutting stroke of the saw is performed, are entirely absorbed by the machine and as a result, not only are objectionable vibration effects upon the user eliminated, but the user will not need to exert any greater physical effort than that required to hold the saw to the work. A further object of the invention is to provide a construction of a portable sawing machine which is adapted to cut curved as well as straight outlines with equal facility.

Another object is to construct the device that a full and unobstructed vision of the work in the zone of action of the cutting blade may be had, whereby scribed cutting lines placed upon the work may be followed with great accuracy.

Other objects are to provide a new and improved construction of a safety guard for the saw blade, and a new and improved construction of a universally adjustable supporting member by means of which the weight of the device may be supported on the material to be cut, and the angle of the cut regulated as desired. These and other objects of the invention will appear more fully from the more detailed description and by reference to the accompanying drawings forming part hereof, wherein Fig. 1 is a front elevation of a portable power driven saw constructed in accordance with the principles of my invention. Fig. 2, is a view similar to Fig. 1 with the cover plate removed and with a portion of the saw guiding means broken away. Fig. 3 is a view partly in side elevation and partly in section; Fig. 4 is a section on the line 4—4 of Fig. 3; Fig. 5 is a somewhat diagrammatic view showing a construction in which the carrier for the saw blade is mounted for oscillatory reciprocation upon a fixed pivot; Fig. 6 is a view similar to Fig. 5 showing a construction similar to, but slightly modified from, that shown in Fig. 5; Figs. 7 and 8 are similar fragmentary views of a portion of the structures shown in Figs. 5 and 6, respectively showing the manner in which the speed of the saw blade may be varied by the substitution of a different saw blade; Fig. 9 is a side view of a modified form of supporting rest; Fig. 10 is a diagrammatic view illustrating the principles which determine the minimum radius of the curved outline which can be cut with the machine; and Figs. 11 and 12 are respectively, a side, and an end, view of a portion of the saw blade illustrating the predetermined relationship between the amplitude of stroke of the blade and the distance between the saw teeth of the blade.

As shown in the drawings, I provide a frame or housing indicated generally by the reference character 10. This housing consists, as shown in Fig. 3, of a back plate 11 and a cover plate 12 separated by a spacer 13 and a carrier guide 14. As shown in Fig. 2, the spacer 13 has a central irregular shaped opening 15 which is closed on one side thereof by the back plate 11 and upon the other side thereof by the carrier guide 14. These three parts co-operate to define a housing space in which the driving mechanism presently to be described is enclosed.

The carrier guide 14 is provided with a pair of spaced parallel guideways 16 in which is slidably mounted a blade carrier 17; said carrier 17 projects at its lower end below the guideways 16 and is provided with a lateral extension 18, the outer face of which projects beyond the cover plate 12. Secured to the extension 18 by any suitable means such as the screws 19, is a saw blade 20. The saw blade 20 is relatively narrow and, as indicated in Fig. 12, is preferably provided with comparatively wide off-set teeth. The teeth are generally off-set to such an extent as to form a kerf at least one and a half times the thickness of the saw blade.

The cover plate 12 is secured to the back plate 11 by means of bolts or screws 21 which pass through both the spacer 13 and carrier guide 14 and hold the parts in assembled condition. At the lower end thereof, the cover plate 12 is slotted, as indicated in Fig. 1 by the reference character 22, to permit the free movement of the extension 18 when the blade carrier 17 is reciprocated.

Any suitable driving mechanism may be employed for reciprocating the blade carrier 17 and the saw blade carried thereby. As shown, such means comprises a pin 23 secured in, and projecting laterally from, the rear face of the blade carrier. Said pin extends into an aperture provided in the upper end of a connecting link 24 slidably mounted between the rear face of the carrier 17 and the front face of the back plate 11; a bushing 25 is preferably interposed between the pin 23 and said aperture of the link 24. At its lower end, the link 24 is provided with a suitable bore in which is received an eccentric throw 26 of a driving shaft 27. The driving shaft 27 may be rotated by any suitable means capable of imparting a rapid rotation to said eccentric.

As shown in the drawings, the driving shaft 27 may be the armature shaft of a small electric motor 28, which motor is secured to the rear face of the back plate 11 by any suitable means such as the screws 29.

In order to reduce to a minimum the physical effort required to operate the tool, means are preferably provided for supporting the entire weight of the parts upon the material being sawed. Such means, as shown, consists of a supporting bracket or rest suitably secured to the device. In the particular constructional examples disclosed, the rest consists of a plate 30 which is provided with a large aperture 31 (see Fig. 4), the diameter of which is slightly larger than that of the motor casing 28. Adjacent to the aperture 31, the plate 30 is provided with a plurality of arcuate slots 32 through which the screws 29 above referred to are adapted to pass and which serve to secure the plate 30 in angularly adjustable position to the back plate 11. At its lower end, the plate 30 is widened and the outer extremities thereof, are provided with a pair of lugs 33 through which a bolt 34 is adapted to pass. The bolt 34 also passes through an apertured boss 35 integral with and at the inner end of a rest plate 36. The bolt 34 has screwed upon it a wing nut 37 which when tightened, serves to clamp the rest plate 36 in fixed relationship to the plate 30. Normally, the plate 36 will be secured in a position at right angles to the saw blade 20 as shown in full lines in Fig. 3 of the drawings. When, however, it is desired to make a miter cut, or a cut extending at an angle to the top face of the material, the plate 36 may be swung from the horizontal position to, or towards, either of the positions indicated in dotted lines in Fig. 3. Any suitable means may be employed for indicating the angularity of the plate 36 with respect to the saw blade 20.

In order to prevent accidental injury to a worker when the tool is being handled and also to prevent damage to the teeth of the saw blade, a guard 40 for said blade is preferably provided. Said guard may be of any suitable construction, as shown, it consists of an arm or a strap 41 pivoted between its ends upon a bolt 42, the latter passing through a suitable hole in the upper part of said arm. In order to hold the blade guard releasably in guarding position, the arm 42 at its upper extremity, has mounted therein, a spring pressed locking pin 43, the inner reduced end of which is normally urged by the spring 44 towards the cover plate 12 for engagement with a hole 45 provided therein. At its lower end, the arm 41 is provided with a laterally extending flange 46 having a length approximately equal to the length of the lower toothed portion of the saw blade 20. For convenience in handling and in manipulating the tool, a handle 47 is preferably secured to the motor casing 28 and also preferably with its center approximately in the plane in which lies the center of the gravity of the tool.

The manner in which the parts so far described operate is as follows: Assuming it is desired to cut a piece of material such as shown in Fig. 1 in dotted lines and as indicated by the reference character 48 in said figure, the tool is rested upon the top of said material and supported thereon by means of the rest plates 30, 36. Before starting a cut, the spring pressed pin 43 is released; the release of such pin and the manner in which the arm 41 is pivotally supported enabling said arm to be swung by the work to one side or from the full line to the dotted line position shown in Fig. 1. The motor 28 being energized, the eccentric throw 26 will be rotated rapidly thus producing through the connecting link 24 and pin 23 a reciprocation of the carrier 17 within the guide 14 as will be readily understood. The extent of eccentricity of the throw 26 is so proportioned relatively to the distance between the teeth 49 of the saw blade that the amplitude of the reciprocatory stroke of said blade will be but slightly greater than the distance from one saw tooth to the tooth next but one thereto. The extent of the stroke is approximately equal to the length of the line $b$ shown in Fig. 11 of the drawings. The speed of reciprocation of the saw blade necessarily depends upon the material being cut and the nature of the work performed. However, the reciprocation is always rapid and is at least approximately equal to the mean reciprocal speed which obtains in power driven saws.

It will be noted that the saw blade 20 is of comparatively small width and therefore the tool can be employed for cutting curved outlines as readily as for making straight cuts. Fig. 10 of the drawings indicates more or less diagrammatically, the factors which limit the extent of curvature of the curved cuts which can be made. It will be obvious by referring to Fig. 10 that the minimum radius of curves which may be cut will be determined by the width of the saw blade and the width of the slot cut, the latter being governed by the amount of set of the saw. Obviously, the narrower the saw and the greater the width of the slot cut by the saw, the smaller the radius of the curve that can be cut.

In Figs. 5 and 6 of the drawings I have shown a slightly modified construction in which the carrier 17$^a$ of the saw blade 20$^a$ is in the form of a lever mounted for reciprocatory oscillation upon a fixed pivot 50. The pivot 50 may be carried by any suitable support such for example as the back plate 11 shown in Figs. 1 to 4 of the drawings. This back plate, however, has not been shown in Figs. 5 and 6. The lever 17$^a$ may take the form of a bell crank the two arms of which form part of an integral structure, or the arm 17$^b$ may be a separate member. In the first case, the bell crank would be pivotally mounted upon the pin 50, whereas in the second case, the arms 17$^a$, 17$^b$ would be keyed or otherwise secured to the pin 50 which would then necessarily be mounted for rotation in any suitable bearings. At its free end, the arm 17$^b$ is pivotally connected by means of a pin 23$^a$ to a connecting link 24$^a$ which, in a manner similar to that shown in Figs. 1 to 4, is actuated by an eccentric throw 26$^a$ of a driving shaft 27$^a$. The constructions of the driving members shown in Figs. 5 and 6 are identical. The only difference between the structures shown in the two figures being that in Fig. 5 of the drawings, the teeth of the saw blade 28 are provided on the convex side of the curved blade whereas, in Fig. 6, the teeth of the saw blade 20$^b$ are formed on the concave side thereof.

With either of the constructions shown in Figs. 5 and 6, the linear speed of travel of the saw blade may be increased by substituting the blades shown in Figs. 7 and 8, and indicated by the reference characters 20$^c$ and 20$^d$ respectively, for the blades 20$^a$ and 20$^b$.

It will be understood that the driving mechanisms shown in Figs. 5 and 6 may be enclosed in a housing similar to that shown in Figs. 1 to 4, that a motor may be employed for actuating said driving mechanism and that in both cases the tool will be provided with a supporting bracket or rest plate as shown in Figs. 1 to 4 but with whatever modification of the specific constructional details of such members as may be necessary or desirable.

With certain classes of work it may be found desirable to have the supporting rest extend upon both sides of the saw blade, in such cases a rest 60 such as shown in Fig. 9 may be employed. Obviously, such a rest will be provided with a slot 61 through which the saw blade projects and the rest may be made adjustable either as shown in Figs. 1 to 4 or in any other suitable manner.

In all forms of the invention shown, it will be noted that the teeth of the saw blades are arranged to perform the cutting stroke when the blade is travelling towards the supporting bracket or rest. It will be apparent that with such an arrangement, the driving mechanism will exert a pull upon the saw blade during the cutting stroke thereby holding the blade under tension. It will thus be seen that it is not necessary to provide any support for the saw blade other than that provided by its attachment to the blade carrier. The tension produced on the saw by pulling instead of pushing it upon its cutting stroke obviates any tendency of the saw blade to buckle. The lower end of the saw blade can thus be left free and not only can the full length of the saw be utilized but it may readily be inserted into a small hole bored into the material for starting a cut at some inner portion of the work. This arrangement also permits kerfs or slots to be cut in the work; the depth of the slot to be cut can be regulated either by providing for adjustment of the plate 30 to and from the end of the saw blade or by interposing blocks between the plate 36 and the top face of the work.

The construction by means of which the blade performs its cutting stroke as it is moving towards the supporting rest also insures that the force necessary to actuate the saw when it is performing its cutting action, will be entirely absorbed by the supporting rest and no physical effort will be required by the operator other than that of holding the saw to the work.

It will be seen that the saw blades in all of the modifications shown and described are of small, simple and relatively inexpensive construction and that as the teeth of the saw are similar to those of the ordinary carpenter's hand saw, replacement and maintenance costs will be relatively low.

While I have shown a satisfactory constructional example which has operated successfully to perform its intended function, it will be understood that the invention is not limited to the specific constructional details of such example but that many changes, variations and modifications may be resorted to without departing from the principles of the invention.

I claim:

1. In a power driven saw, a narrow saw blade having off-set teeth to form a kerf at least one and a half times the thickness of the blade, and means for imparting a short stroke rapid reciprocation to said blade, the amplitude of said stroke being approximately that of the distance between three adjacent teeth of said blade, and the speed of reciprocation being approximately equal to the mean reciprocal speed attained in power driven saws.

2. In a power driven saw, a narrow saw blade having off-set teeth to form a kerf at least one and a half times the thickness of the blade, means for imparting a short stroke rapid reciprocation to said blade, the amplitude of said stroke being approximately that of the distance between three adjacent teeth of said blade, and the speed of reciprocation being approximately equal to the mean reciprocal speed attained in power driven saws, and a pivotally mounted safety guard for enclosing said blade.

3. In a power driven saw, a narrow saw blade having off-set teeth to form a kerf at least one and a half times the thickness of the blade, means for imparting a short stroke rapid reciprocation to said blade, the amplitude of said stroke being approximately that of the distance between three adjacent teeth of said blade, and the speed of reciprocation being approximately equal to the mean reciprocal speed attained in power driven saws, a rest for supporting said saw upon the material being cut, and means for adjusting said rest in at least two planes.

In testimony whereof I have hereunto set my hand.

GUSTAVE A. UNGAR.